2,917,388

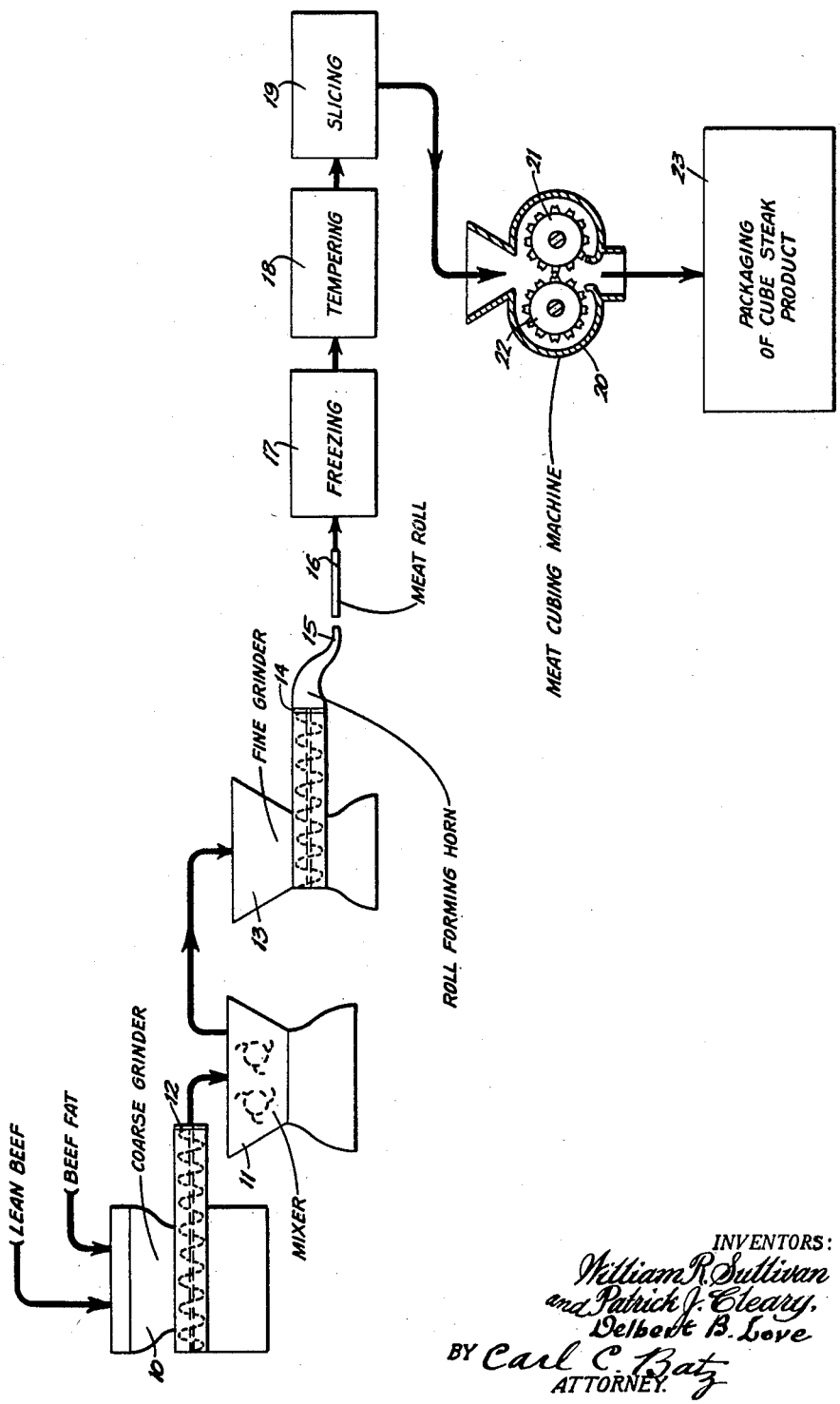

STEAK MAKING PROCESS

William R. Sullivan, Chicago, Patrick J. Cleary, Bradley, and Delbert B. Love, Chicago, Ill., assignors to Armour and Company, Chicago, Ill., a corporation of Illinois Application April 21, 1958, Serial No. 729,571

5 Claims. (Cl. 99—107)

This invention relates to a steak making process. More particularly this invention relates to a method of manufacturing a novel steak-like product, which, though formed from small particles or granules of meat has the taste, texture and appearance of cube steak prepared from a unitary slice of beef.

So-called "cube steaks" have been prepared and sold for a number of years. When cube steaks are prepared from a unitary slice of beef, as is usually the case, it has been found necessary to employ a relatively high grade of beef to produce a satisfactory product. Although the cubing operation has considerable tenderizing effect on the meat, it is not sufficient to permit tender cube steaks to be produced from a unitary slice of beef of the type from which hamburger is usually made. Attempts have also been made to make satisfactory cube steaks from a plurality of thin slices of beef and also from beef flakes or wafers so as to permit tender cube steaks to be made from poor grades of beef. However, cube steaks formed from slices and flakes of beef have not had as satisfactory a texture as cube steaks produced by the method of this invention. A particular objection is that cube steaks made from slices and flakes tend to come apart in cooking. In other words, it has not heretofore been possible to make cube steaks from subdivided beef which had a similar texture, taste and appearance to cube steaks formed from single pieces of beef.

It is therefore a principal object of this invention to provide a method of preparing cube steaks from beef cuts, scraps, trimmings, etc. which would not otherwise be suitable for a steak-type product by providing a means for forming cube steaks from subdivided pieces of beef, which cube steaks are comparable in taste, texture and appearance to cube steaks produced from unitary slices of beef. Further objects and advantages will appear as the specification proceeds.

A diagrammatic flow sheet illustrating an embodiment of the method of this invention is shown in the accompanying drawing.

In one of its aspects, this invention is concerned with a steak making process characterized by the step of impressing a reticulated pattern on a semi-frozen meat slice composed of a mixture of ground beef and ground beef fat. In somewhat greater detail, this invention is concerned with a method of preparing a steak-like product characterized by the steps of grinding pieces of relatively lean beef and beef fat or relatively fat beef into small granules, thoroughly intermixing the lean beef granules with the beef fat granules, extruding the mixture thus obtained into elongated meat bodies, freezing the meat bodies, tempering the frozen meat bodies to a semi-frozen condition, slicing the tempered meat bodies crosswise or transversely to obtain a plurality of semi-frozen slices, and then subjecting the semi-frozen slices to a cubing operation by passing them either one at a time or in stacks of two or more through a steak cubing machine to modify the texture and appearance of the slices and thereby produce a steak-like product. The fat granules may be obtained by grinding either beef fat or relatively fat beef since either source after grinding will produce the fat granules which aid in producing a cohesive meat body.

In practicing the method just described it had been found that the lean beef and beef fat granules should be of an approximately uniform particle size within the range from about 1/16 to 3/16 inch in diameter. The mixing together of such granules disperses the fat granules substantially uniformly throughout the lean beef granules. This is important because in the final cubing operation the fat granules act as a binder to produce a cohesive meat body from one having a granular texture. However, it is desired to preserve the granular texture until the cubing operation, that is, the pressure applied to the meat mixture in the extruding step should be kept low enough so that the extruded meat body preserves a definite granular texture and without the fat therein being emulsified to the point where the extruded meat body has a pasty texture. The extruded meat body should be frozen rapidly, preferably at a temperature not over 10° F., and then tempered at a temperature of from 26 to 30° F. to a semi-frozen condition. It has also been found desirable to introduce an initial tempering step before the freezing step, wherein the extruded meat bodies are held at a temperature of about 40 to 45° F. for several hours.

After the final tempering step in which the meat body is brought to a semi-frozen condition, it is preferred to slice the meat body transversely into slices having a thickness of about 3/8 to 5/8 inch. These slices are preferably one at a time while still in a semi-frozen condition knitted together by impressing a reticulated pattern on both sides thereof. As indicated, this can readily be accomplished by cubing the slices in any of the standard steak cubing machines such as a Leland cube steak machine. This step has been found to have the surprising result of knitting the granules in the slices together so as to produce a steak-like product which has the taste, texture and appearance of cube steak formed from a unitary slice of beef.

Reference is made to the accompanying flow sheet by way of an example of a specific embodiment of the method of this invention. Relatively lean beef is fed into a coarse grinder 10 from which it is deposited into a mixer 11. Beef fat or relatively fat beef is also passed through grinder 10 and discharged in the mixer 11. The preliminary or coarse grinding at this point preferably produces granules of from 3/8 to 1 1/2" in diameter. This can readily be accomplished by providing plate 12 with grinding apertures of the desired size. The coarse granules of lean beef and beef fat are thoroughly mixed in mixer 11, and the mixture is then passed to fine grinder 13, wherein it is further mixed and ground to a smaller size by plate 14. At this point the particle size preferably averages about 1/16 to 3/16" in diameter. After issuing from plate 14 the mixture is forced into and through a roll-forming horn 15. The extruded meat roll 16 coming out of the end of horn 15 is then subjected to a rapid freezing at 17, which may if desired be preceded by several hours of tempering at temperature of from 40 to 45° F. The freezing is carried out at a temperature below 10° F.

The frozen meat rolls are then tempered at 18 to a semi-frozen condition at a temperature of 26 to 28° F. The tempered rolls are then sliced at 19 into slices of approximately 1/2" in thickness. These slices are then passed one at a time through cube steak machine 20 which is equipped with a plurality of interleaving cubing disks 21 and 22. In the cubing operation the semi-frozen slices have a reticulated pattern impressed on both sides thereof, which knits together the granules of beef fat and lean beef to produce a texture approaching that of cube steak produced from a unitary slice of beef, while at the same time making the tenderness of the cube steak product much more independent than heretofore of the type and grade of meat employed. The cube steak product is then packaged at 23.

This application is a continuation-in-part of patent application Serial No. 361,694, filed June 15, 1953, by the same co-inventors, and now abandoned.

While in the foregoing specification this invention has been described in relation to a preferred embodiment thereof and specific details have been set forth for purpose of illustration, it will be apparent to those skilled in the art that the method of this invention is susceptible to other embodiments and that many of the details set forth can be varied widely without departing from the basic concepts underlying the invention.

We claim:

1. The method of preparing a steak product characterized by the steps of grinding relatively lean beef and relatively fat beef into relatively uniform granules ranging in diameter from about 1/16 to 3/16", thoroughly intermixing the lean beef granules with the beef fat granules to disperse the fat granules throughout the lean beef granules and provide a binder therefor, extruding the mixture thus obtained into elongated meat bodies while preserving the granular texture of the meat bodies and without appreciably emulsifying the fat therein, rapidly freezing the meat bodies, tempering the frozen meat bodies at a temperature of about 26 to 30° F. to a semi-frozen condition, slicing the tempered meat bodies crosswise to obtain a plurality of semi-frozen slices ranging in thickness from about 3/8 to 5/8", and then impressing a reticulated pattern on both sides of each slice, said slices being impressed individually and in a non-stacked relationship.

2. The method of preparing a steak product characterized by the steps of grinding pieces of relatively lean beef and relatively fat beef into granules ranging in diameter from about 3/8 to 1½", thoroughly intermixing the lean beef granules with the beef fat granules, regrinding the mixture to produce a granule diameter in the mixture from about 1/16 to 3/16", extruding the mixture thus obtained into cylindrical bodies, tempering the cylindrical meat bodies at a temperature of from 40 to 45° F. for several hours, rapidly freezing the tempered meat bodies at a temperature below 10° F., tempering the frozen meat bodies at a temperature of from 26 to 30° F. to a semi-frozen condition, slicing the semi-frozen meat bodies crosswise to obtain a plurality of semi-frozen slices ranging in thickness from about 3/8 to 5/8", and then impressing a reticulated pattern on both sides of said slices to knit together the lean beef and fat granules within the body of the slice, said slices being thereby modifying the texture and appearance of the slices and producing a steak product comparable in texture and appearance to cube steaks produced from unitary slices of beef.

3. A method of preparing a steak product characterized by the steps of preparing a mixture of lean beef granules and beef fat granules, said granules ranging in diameter from about 1/16 to 3/16", forming the mixture thus obtained into elongated meat bodies, freezing the meat bodies, tempering the frozen meat bodies at a temperature of from 26 to 30° F. to semi-frozen condition, slicing the tempered meat bodies crosswise to obtain a plurality of semi-frozen slices ranging in thickness from about 3/8 to 5/8", and then impressing a reticulated pattern on the semi-frozen slices to modify the texture and appearance of the slices and thereby produce a steak product comparable in texture and appearance to cube steaks produced from unitary slices of beef, said slices being impressed individually and in a non-stacked relationship.

4. The method of preparing a steak product characterized by the steps of grinding relatively lean beef and beef fat into relatively uniform granules ranging in diameter from about 1/16 to 3/16", thoroughly intermixing the lean beef granules with the beef fat granules to disperse the fat granules throughout the lean beef granules and provide a binder therefor, extruding the mixture thus obtained into elongated meat bodies while preserving the granular texture of the meat bodies and without appreciably emulsifying the fat therein, rapidly freezing the meat bodies, tempering the frozen meat bodies at a temperature of about 26 to 30° F to a semi-frozen condition, slicing the tempered meat bodies crosswise to obtain a plurality of semi-frozen slices ranging in thickness from about 3/8 to 5/8", and then impressing a reticulated pattern on both sides of each slice, said slices being impressed individually and in a non-stacked relationship.

5. The method of preparing a steak product characterized by the steps of grinding pieces of relatively lean beef and beef fat into granules ranging in diameter from about 3/8 to 1½", thoroughly intermixing the lean beef granules with the beef fat granules, regrinding the mixture to produce a granule diameter in the mixture from about 1/16 to 3/16", extruding the mixture thus obtained into cylindrical bodies, tempering the cylindrical meat bodies at a temperature of from 40 to 45° F. for several hours, rapidly freezing the tempered meat bodies at a temperature below 10° F., tempering the frozen meat bodies at a temperature of from 26 to 30° F. to a semi-frozen condition, slicing the semi-frozen meat bodies crosswise to obtain a plurality of semi-frozen slices ranging in thickness from about 3/8 to 5/8", and then impressing a reticulated pattern on both sides of said slices to knit together the lean beef and fat granules within the body of the slice, said slices being impressed individually and in a non-stacked relationship, thereby modifying the texture and appearance of the slices and producing a steak product, comparable in texture and appearance to cube steaks produced from unitary slices of beef.

References Cited in the file of this patent

UNITED STATES PATENTS

| | | |
|---|---|---|
| 2,020,843 | Lohner | Nov. 12, 1935 |
| 2,251,801 | Plitt et al. | Aug. 5, 1941 |
| 2,398,636 | Henney et al. | Apr. 16, 1946 |
| 2,440,168 | Cross | Apr. 20, 1948 |
| 2,673,156 | Minder | Mar. 23, 1954 |